(12) United States Patent
Shimai et al.

(10) Patent No.: US 11,436,464 B2
(45) Date of Patent: Sep. 6, 2022

(54) IC TAG

(71) Applicant: NITTA CORPORATION, Osaka (JP)

(72) Inventors: Toshiharu Shimai, Yamatokooriyama (JP); Hirofumi Tsujimoto, Yamatokooriyama (JP)

(73) Assignee: NITTA CORPORATION, Osaka (JP)

( * ) Notice: Subject to any disclaimer, the term of this patent is extended or adjusted under 35 U.S.C. 154(b) by 0 days.

(21) Appl. No.: 17/267,313

(22) PCT Filed: Aug. 8, 2019

(86) PCT No.: PCT/JP2019/031537
§ 371 (c)(1),
(2) Date: Mar. 10, 2021

(87) PCT Pub. No.: WO2020/032220
PCT Pub. Date: Feb. 13, 2020

(65) Prior Publication Data
US 2021/0342665 A1    Nov. 4, 2021

(30) Foreign Application Priority Data
Aug. 10, 2018  (JP) .............................. JP2018-151346

(51) Int. Cl.
*G06K 19/077*  (2006.01)
(52) U.S. Cl.
CPC . *G06K 19/07728* (2013.01); *G06K 19/07773* (2013.01)
(58) Field of Classification Search
CPC ................... G06K 19/07728; G06K 19/07773
(Continued)

(56) References Cited

U.S. PATENT DOCUMENTS

2006/0290514 A1* 12/2006 Sakama ........... G06K 19/07749
340/572.7
2008/0020516 A1*  1/2008 Kawai ................. B60C 23/0493
438/118
(Continued)

FOREIGN PATENT DOCUMENTS

EP      2 065 841 A1    6/2009
EP      2 506 192 A2   10/2012
(Continued)

OTHER PUBLICATIONS

International Search Report (PCT/ISA/210) issued in PCT/JP2019/031537 dated Oct. 21, 2019.
(Continued)

*Primary Examiner* — Allyson N Trail
(74) *Attorney, Agent, or Firm* — Birch, Stewart, Kolasch & Birch LLP (57) ABSTRACT

An IC tag according to the present invention includes: a sheet-shaped tag main body having an outer shape that extends in a lengthwise direction and a widthwise direction orthogonal to the lengthwise direction; and a reinforcing member that is arranged along the widthwise direction so as to cover a surrounding area of the tag main body. The tag main body includes: an IC chip; an antenna configured to electrically transmit and receive information stored in the IC chip; and a sheet-shaped substrate that supports the IC chip and the antenna. The reinforcing member is made of a material having a Shore D hardness that is less than or equal to a Shore D hardness of the substrate, and is arranged so as to cover at least the IC chip.

7 Claims, 6 Drawing Sheets

(58) Field of Classification Search
USPC .......................................................... 235/492
See application file for complete search history.

(56) References Cited

U.S. PATENT DOCUMENTS

| | | | |
|---|---|---|---|
| 2008/0042266 A1* | 2/2008 | Kagaya | G06K 19/07718 |
| | | | 257/724 |
| 2009/0130393 A1 | 5/2009 | Kobayashi et al. | |
| 2010/0093190 A1* | 4/2010 | Miwa | H01R 13/40 |
| | | | 439/65 |
| 2010/0123011 A1 | 5/2010 | Baba et al. | |
| 2011/0272470 A1 | 11/2011 | Baba et al. | |
| 2012/0248198 A1 | 10/2012 | Baba et al. | |
| 2013/0277433 A1 | 10/2013 | Baba et al. | |
| 2015/0122891 A1* | 5/2015 | Nakano | G06K 19/07728 |
| | | | 235/488 |
| 2015/0314542 A1 | 11/2015 | Tucker | |
| 2018/0066133 A1* | 3/2018 | Chen | C08L 69/00 |
| 2020/0308324 A1* | 10/2020 | Oderkerk | A43B 13/04 |

FOREIGN PATENT DOCUMENTS

| | | |
|---|---|---|
| EP | 2 654 000 A1 | 10/2013 |
| JP | 3-52255 A | 3/1991 |
| JP | 2012-212198 A | 11/2012 |
| JP | 5139239 B2 | 2/2013 |
| JP | 2013-222411 A | 10/2013 |
| JP | 2017-220199 A | 12/2017 |

OTHER PUBLICATIONS

Written Opinion (PCT/ISA/237) issued to PCT/JP2019/031537 dated Oct. 21, 2019.
Extended European Search Report for European Application No. 19847933.9, dated Apr. 11, 2022.

* cited by examiner

IC TAG

TECHNICAL FIELD

The present invention relates to an IC tag.

BACKGROUND ART

In recent years, as one type of IC tag, various inlets have been proposed in which a radio-wave communication antenna pattern and an IC chip are mounted on a base sheet composed of plastic or paper. Also, Patent Literature 1 discloses an IC tag in which an IC chip is protected by arranging a reinforcing member that is formed using a hard material such as a fiber-reinforced resin on the upper surface and the lower surface of an inlet.

CITATION LIST

Patent Literature

Patent Literature 1: Japanese Patent No. 5139239

SUMMARY OF INVENTION

Technical Problem

Incidentally, since the reinforcing member of the above-described IC tag is made of a hard material, the IC chip can be protected, but when the IC tag is bent, there is a risk that the reinforcing member will break due to the bending.

The present invention was made to solve the above-described problem, and aims to provide an IC tag that can protect an IC chip and prevent damage to the reinforcing member.

Solution to Problem

An IC tag according to the present invention includes a sheet-shaped tag main body having an outer shape that extends in a lengthwise direction and a widthwise direction orthogonal to the lengthwise direction; and a reinforcing member that is arranged along the widthwise direction so as to cover a surrounding area of the tag main body. The tag main body includes: an IC chip; an antenna configured to electrically transmit and receive information stored in the IC chip; and a sheet-shaped substrate that supports the IC chip and the antenna. The reinforcing member is made of a material having a Shore D hardness that is less than or equal to a Shore D hardness of the substrate, and is arranged so as to cover at least the IC chip.

In the above-described IC tag, the length in the lengthwise direction of the reinforcing member can be made shorter than the length in the widthwise direction.

In the above-described IC tag, at least one slit or groove that extends in the lengthwise direction can be formed in the reinforcing member.

In the above-described IC tag, at least a pair of the slits or grooves can be formed, and the pair of the slits or grooves can be arranged with the IC chip interposed therebetween in the widthwise direction.

In the above-described IC tag, the tag main body can further include: a sheet-shaped cover that covers the IC chip and the antenna, the IC chip and the antenna being disposed between the cover and the substrate; and a pressure-sensitive adhesive or bonding agent that bonds the cover and the substrate.

In the above-described IC tag, the reinforcing member can be made of elastomer.

In the above-described IC tag, the elastomer can contain glass fibers.

Advantageous Effects of Invention

With the IC tag according to the present invention, it is possible to protect the IC chip and to prevent damage to the reinforcing member.

DESCRIPTION OF EMBODIMENTS

1. Overview of IC Tag

Figure 1:
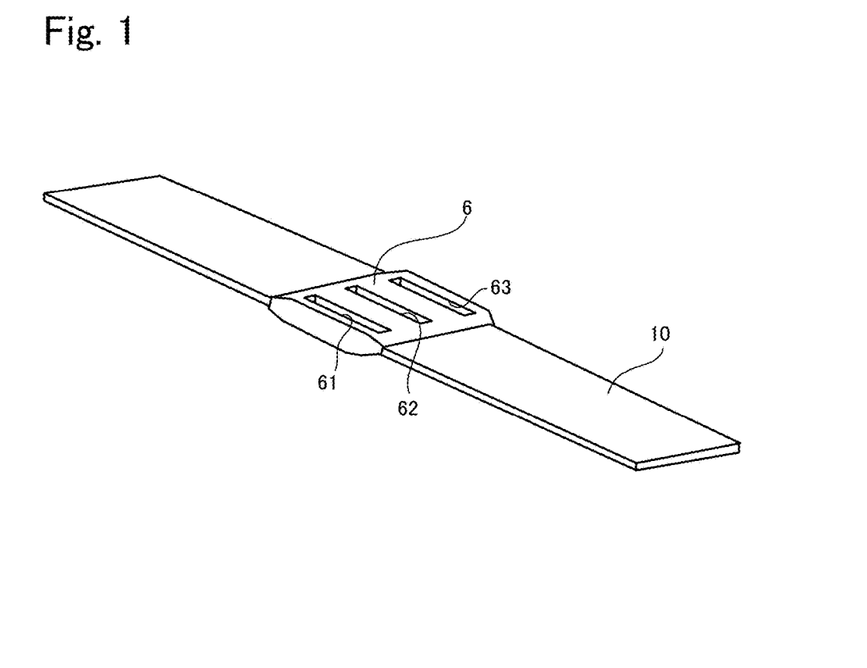
FIG. 1 is a perspective view showing an embodiment of an IC tag according to the present invention.
Figure 2:
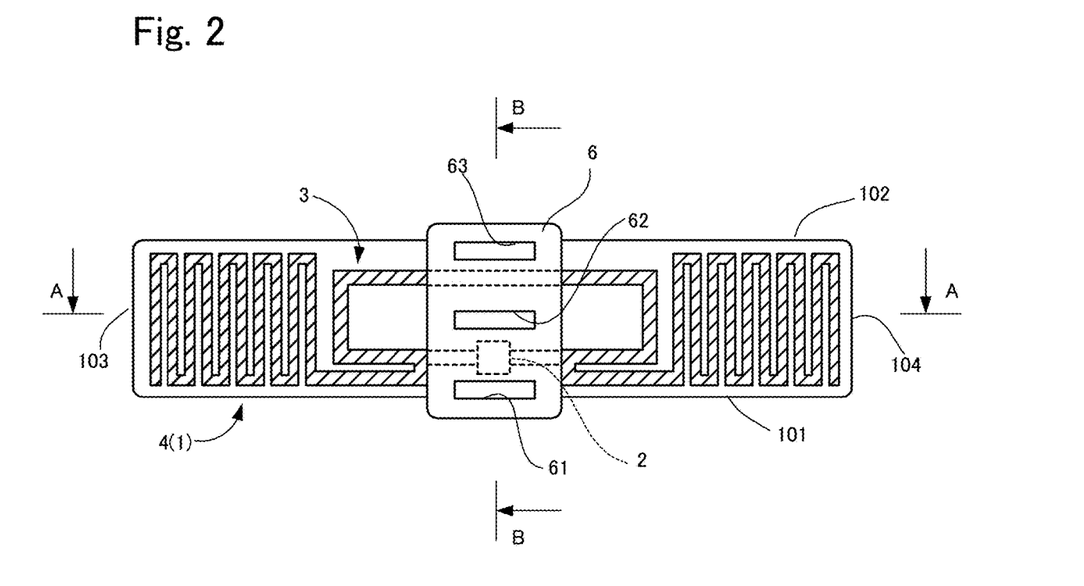
FIG. 2 is a plan view of the IC tag shown in FIG. 1.
Figure 3:
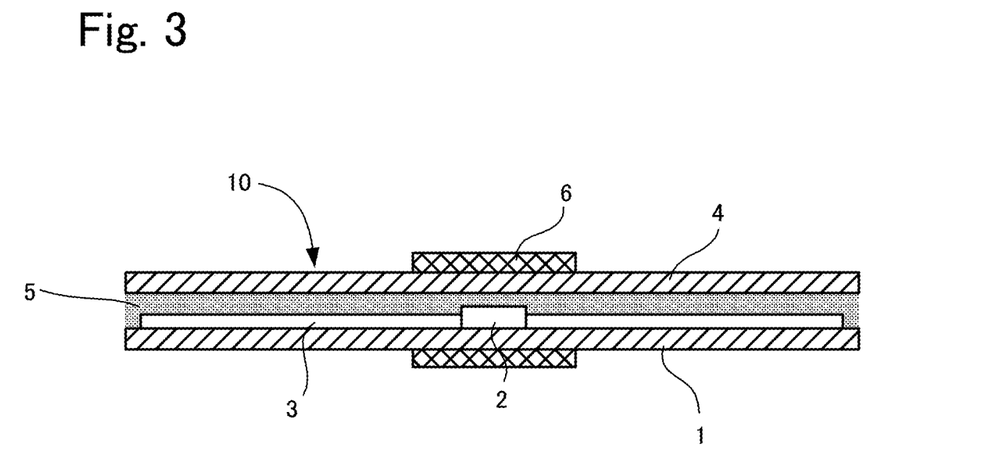
FIG. 3 is a cross-sectional view taken along line A-A of the IC tag shown in FIG. 2.
Figure 4:
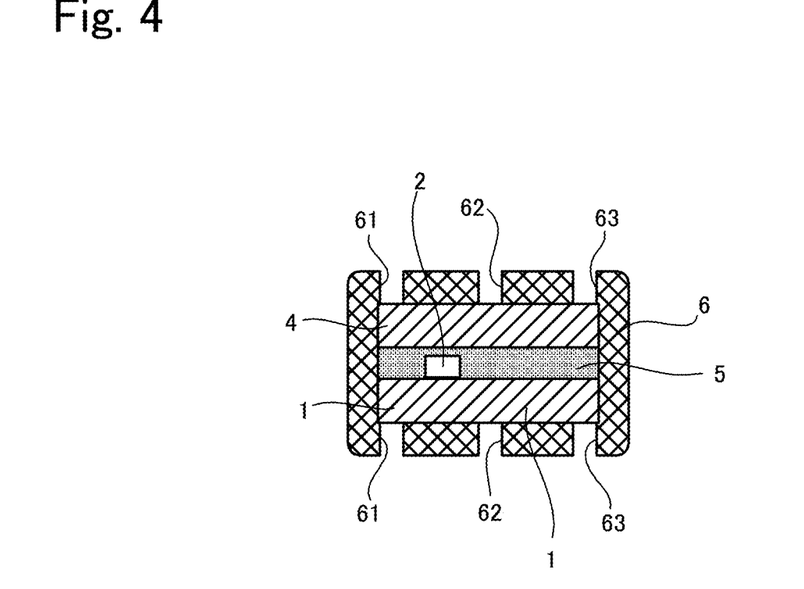
FIG. 4 is a cross-sectional view taken along line B-B of the IC tag shown in FIG. 2.
Figure 5:
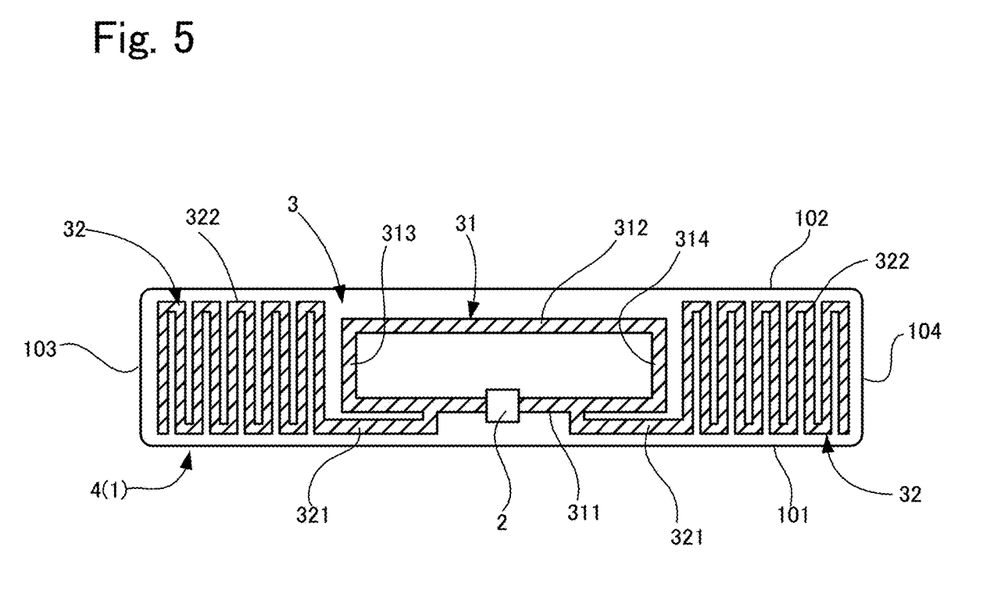
FIG. 5 is a plan view of an inlet.

Hereinafter, an embodiment of an IC tag according to the present invention will be described with reference to the drawings. FIG. 1 is perspective view of the IC tag according to the present embodiment, FIG. 2 is a plan view of FIG. 1, FIG. 3 is a cross-sectional view taken along line A-A in FIG. 2, FIG. 4 is a cross-sectional view taken along line B-B in FIG. 2, and FIG. 5 is a plan view of an inlet. As shown in FIGS. 1 to 5, the IC tag according to the present embodiment includes an inlet (tag main body) 10 including a sheet-shaped substrate 1 that is formed into a rectangular shape, an IC chip 2 and an antenna 3 that are arranged on the substrate 1, a sheet-shaped cover 4 that is formed into a rectangular shape and covers the IC chip 2 and the antenna 3. Also, the substrate 1 and the cover 4 are bonded to each other using by a pressure-sensitive adhesive 5. Furthermore, the IC tag includes a reinforcing member 6 that is attached to the inlet 10. Hereinafter, these members will be described in detail.

1-1. Substrate and Cover

As shown in FIGS. 3 and 4, the substrate 1 and the cover 4 are formed in the same shape, and the pressure-sensitive adhesive 5 is disposed so as to completely fill the gap between the substrate 1 and the cover 4. That is, the pressure-sensitive adhesive 5 covers the IC chip 2 and the antenna 3 in such a manner that the IC chip 2 and the antenna 3 are not exposed from the gap between the substrate 1 and the cover 4.

There is no particular limitation on the materials of the substrate 1 and the cover 4, and, for example, the materials may be formed using polyethylene, polypropylene, polyethylene terephthalate, polyvinyl chloride, or the like. The thicknesses of the substrate 1 and the cover 4 are, for example, preferably 25 to 200 µm and more preferably 25 to 100 µm. The material constituting the substrate 1 and the cover 4 can be made of a transparent material or a colored material. In the present embodiment, a transparent material is used, and the IC chip 2 and the antenna 3 are visible via the substrate 1 or the cover 4.

Hereinafter, as shown in FIG. 2, sides of the substrate 1 and the cover 4 in the lengthwise direction are referred to as a first side 101 and a second side 102, and sides of the same in the widthwise direction are referred to as a third side 103 and a fourth side 104, for the sake of convenience of explanation. Accordingly, these sides are connected to each other in the order of the first side 101, the third side 103, the second side 102, and the fourth side 104.

1-2. IC Chip and Antenna

As shown in FIG. 5, the IC chip 2 is a known IC chip having a memory function and there is no particular limitation thereon. However, for example, the IC chip 2 is electrically connected to the antenna 3, which is made of a conductor such as aluminum or copper. Although a known antenna can be used, the antenna 3 can be constituted by, for example, a dipole antenna. In the present embodiment, as one example, a dipole antenna as shown in FIG. 5 is used. That is, the antenna 3 includes an impedance matching portion 31 that is arranged near the center in the lengthwise direction of the substrate 1, and a pair of dipole portions 32 that extend in the lengthwise direction of the substrate 1 from the impedance matching portion 31. The impedance matching portion 31 is formed into a rectangular frame shape having first to fourth sides. More specifically, a first side 311 of the impedance matching portion 31 is arranged along a first side 101 of the substrate 1, and a second side 312 is arranged at a position that is slightly spaced apart from a second side 102 of the substrate 1. That is, in the impedance matching portion 31, the first side 311, the third side 313, the second side 312, and the fourth side 314 are joined in the stated order. Also, the IC chip 2 is arranged near the center of the first side 311 of the impedance matching portion 31.

The dipole portions 32 have a left-right symmetrical shape, and therefore only one of them will be described. The dipole portion 32 includes a first portion 321 that extends in the form of a straight line along the first side 101 of the substrate 1 from the first side 311 of the impedance matching portion 31, and a second portion 322 that is connected to the end portion of the first portion 321 and is formed into a rectangular wave shape.

This kind of antenna 3 can be formed on one surface of the substrate 1 through etching, screen printing, or the like, and thereafter the IC chip 2 can be attached on the antenna 3 through bonding or the like. Also, for example, the information stored in the IC chip 2 can be transmitted and received using UHF-band radio waves by the above-described antenna 3. Note that the IC chip 2 can also be fixed to the antenna 3 through, for example, known flip-chip mounting for an electronic part, or the like.

1-3. Pressure-Sensitive Adhesive

The pressure-sensitive adhesive 5 can be formed using, for example, a rubber-based pressure-sensitive adhesive in which the main component is natural rubber or synthetic rubber. There is no particular limitation on the thickness of the pressure-sensitive adhesive 5, but the thickness is preferably 25 to 500 µm, and more preferably 25 to 100 µm. There is no particular limitation on the synthetic rubber used as the rubber-based pressure-sensitive adhesive, and specific examples thereof can include styrene-isoprene-styrene-block copolymer, styrene-butadiene-styrene-block copolymer, hydrogenated styrene-based copolymer, styrene-butadiene rubber (SBR), polyisoprene rubber (IR), polyisobutylene (PIB), and butyl rubber (IIR).

The rubber-based pressure-sensitive adhesive 5 may further contain a tackifier, in addition to the above-described natural rubber or synthetic rubber. Examples of the tackifier include terpene phenol resins, rosin resins, and petroleum resins. The amount of resin to be used as the tackifier can be selected as appropriate within a range where the pressure-sensitive adhesion performance is not impaired. In addition to the above-described components, the rubber-based pressure-sensitive adhesive may optionally contain additives such as a softener, a plasticizer, a filler, an anti-aging agent, and a coloring agent as necessary.

Furthermore, as the pressure-sensitive adhesive 5, not only the rubber-based pressure-sensitive adhesive but also an acrylic pressure-sensitive adhesive or a silicone pressure-sensitive adhesive can be used.

Instead of the pressure-sensitive adhesive 5, it is also possible to use a bonding agent, and for example, the bonding agent can be made of a curable-type bonding agent whose main component is an acrylic thermosetting resin, an ester-based thermosetting resin, an epoxy-based thermosetting resin, or a poly-imide-based thermosetting resin. If an epoxy-based thermosetting resin is to be used as the main component, it is possible to use a novolak-type epoxy resin, a bisphenol-type epoxy resin, a biphenyl-type epoxy resin, an alicyclic epoxy resin, a cyclopentadiene-type epoxy resin, or the like. Various materials can be used also if another acrylic thermosetting resin, ester-based thermosetting resin, or polyimide-based thermosetting resin is used as the main component.

1-4. Reinforcing Member

Next, the reinforcing member 6 will be described. The reinforcing member 6 is arranged near the center in the lengthwise direction of the inlet 10 and is formed into a rectangular shape in a plan view so as to cover the IC chip 2. To give a more detailed description, the reinforcing member 6 is arranged so as to surround the inlet 10 over the entire periphery in the widthwise direction. That is, as shown in FIG. 4, the reinforcing member 6 includes a lower surface portion that covers the substrate 1, an upper surface portion that covers the cover 4, and a pair of side surface portions that join the lower surface portion and the upper surface portion in the thickness direction of the inlet 10, and these portions are formed in one piece. Also, three slits that extend in the lengthwise direction are formed in each of the upper surface portion and the lower surface portion. That is, a first slit 61 that extends along the first side 101 of the cover 4, a second slit 62 that is formed near the center in the widthwise direction of the cover 4, and a third slit 63 that extends along the second side 102 of the cover 4 are formed in the upper surface portion. Three slits 61 to 63 are similarly formed also in the lower surface portion.

Also, as shown in FIG. 2, the above-described IC chip 2 is arranged between the first slit 61 and the second slit 62 in the widthwise direction.

There is no particular limitation on the reinforcing member 6, as long as it is a material with a Shore D hardness that is lower than that of the substrate 1 or a material with the same Shore D hardness as the substrate 1, but for example, the reinforcing member 6 can be formed using an elastic body such as a thermoplastic elastomer or rubber. Specifically, an ester-based elastomer, a styrene-based elastomer, a butadiene-based elastomer, an olefin-based elastomer, a urethane-based elastomer, or the like can be used as the thermoplastic rubber. On the other hand, silicone rubber, butyl rubber, nitrile rubber, hydrogenated nitrile rubber, fluororubber, natural rubber, isoprene rubber, EPDM rubber, urethane rubber, chlorosulfonated polyethylene rubber, epichlorohydrin rubber, or the like can be used as the rubber. Also, this kind of reinforcing member 6 preferably has a suitable degree of flexibility, and for example, it is preferable to use a material with a Shore D hardness of less than 80, and more preferable to use a material with a Shore D hardness of 75 or less. On the other hand, the substrate 1 is preferably made of a material with a Shore D hardness of, for example, 80 or more. In this respect, the cover 4 can also be formed similarly. Note that this is one specific example of the Shore D hardness, and there is no limitation thereto, and the Shore D hardness of the reinforcing member 6 need only be at least the Shore D hardness of the substrate 1 or less. Also, although the Shore D hardness of the cover 4 may also be made the same as that of the substrate 1, it need not necessarily be the same.

It is also possible to include glass fibers in the material constituting the reinforcing member 6 in order to improve the heat resistance. For example, a material obtained by including glass fibers in an ester-type elastomer can be used as the reinforcing member 6.

There is no particular limitation on the method for manufacturing the reinforcing member 6, and for example, the inlet 10 can be accommodated in a mold and the reinforcing member 6 can be molded on the inlet 10 through injection molding.

2. Characteristics

The IC tag constituted as described above can obtain the following effects.

(1) In the present embodiment, the reinforcing member 6 is attached so as to surround the entire periphery of the inlet 10 in the widthwise direction. That is, since the reinforcing member 6 is formed so as to cover the upper surface, the lower surface, and the side surfaces of the inlet 10, it is possible to prevent the cover 4 from separating from the substrate 1. Also, the inlet 10 can be made less likely to bend compared to a case where the reinforcing member is provided on only the upper surface or the lower surface. For this reason, for example, it is possible to prevent the IC chip 2 from breaking and the antenna 3 from disconnecting due to bending at a location at which stress is likely to be concentrated due to bending, such as the IC chip 2 or the portion at which the IC chip 2 and the antenna 3 are bonded.

Figure 6:
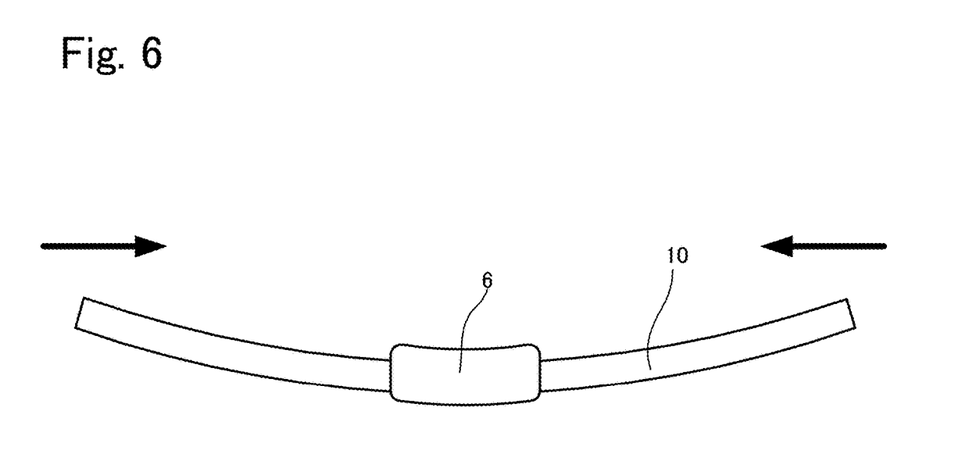
FIG. 6 is a side view showing bending in a lengthwise direction of the IC tag shown in FIG. 1.

(2) Since the reinforcing member 6 is formed to be longer in the widthwise direction of the inlet 10 and to be shorter in the lengthwise direction, the reinforcing member 6 can be made less likely to bend with respect to bending in the lengthwise direction as shown in FIG. 6, in comparison to bending in the widthwise direction.

Figure 7:
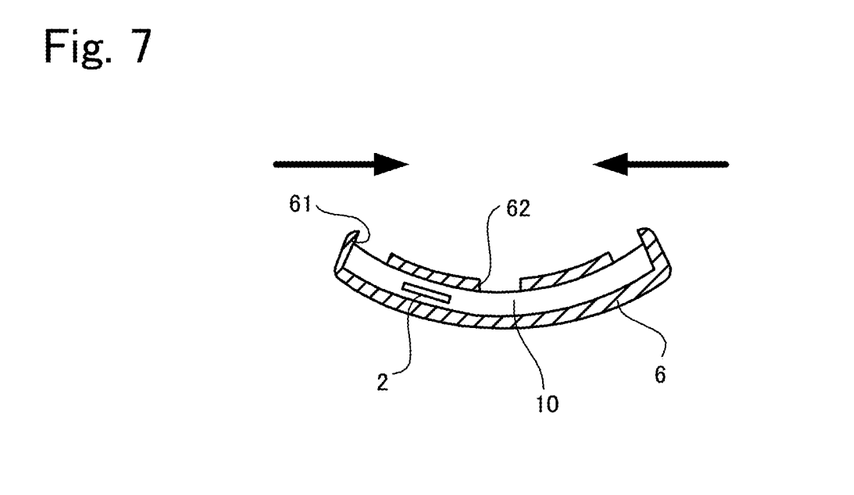
FIG. 7 is a side view showing bending in a widthwise direction of the IC tag shown in FIG. 1.

(3) On the other hand, there is a risk that the reinforcing member 6 will be more likely to bend with respect to bending in the widthwise direction of the inlet 10 or bending in which the inlet 10 is twisted, as shown in FIG. 7, compared to the bending in the lengthwise direction. However, since the first and second slits 61 and 62 are formed with the IC chip 2 interposed therebetween, the reinforcing member 6 is more likely to bend at the portions at which the slits 61 and 62 are formed with respect to this bending. As a result, it is possible to suppress bending at the portion at which the IC chip 2 is arranged, and it is possible to prevent the IC chip 2 or the portion at which the IC chip 2 and the antenna 3 are joined from breaking.

Figure 8:
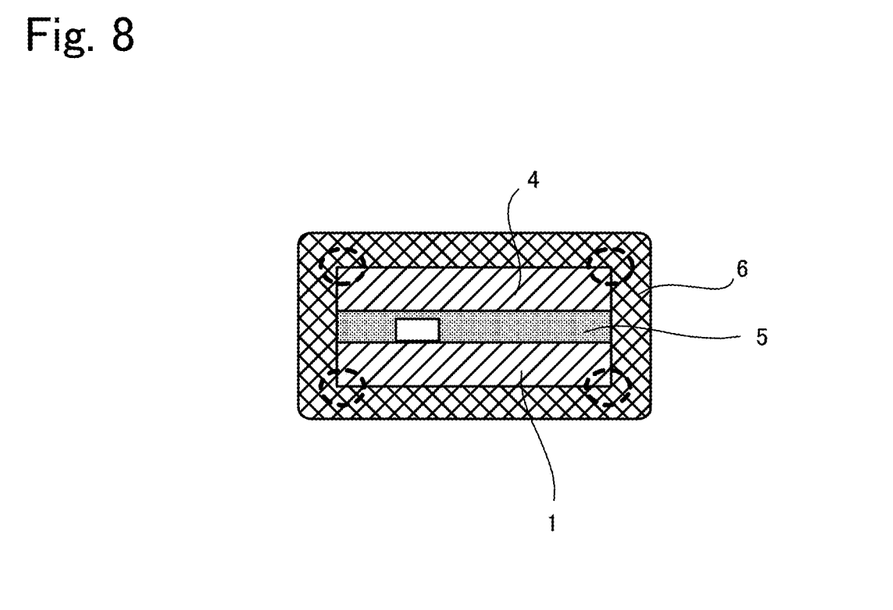
FIG. 8 is a cross-sectional view in a widthwise direction of the IC tag shown in FIG. 1.

(4) If the reinforcing member 6 is made of a hard material, for example, when bending in the lengthwise direction as shown in FIG. 6 occurs, as shown in FIG. 8, stress is likely to be concentrated near the corner portions of the inlet 10 (the circled portions, in particular, both end portions in the lengthwise direction of the reinforcing member 6) in a cross-section in the widthwise direction, and thus there is a risk that breakage will occur, such as the reinforcing member 6 breaking. In contrast to this, with the present embodiment, the reinforcing member 6 is made of a material with the same hardness as the substrate 1 or a lower hardness than the substrate 1, and therefore it is possible to prevent breakage of the reinforcing member 6 due to the corner portions of the inlet 10 as described above.

(5) If the substrate 1 and the cover 4 are made of a material with a high chemical resistance, such as polyethylene terephthalate, the antenna 3 and the IC chip 2 can be protected even if the IC tag is used in an environment accompanying a chemical. Note that although the pressure-sensitive adhesive 5 is exposed from between the substrate 1 and the cover 4, since the thickness of the pressure-sensitive adhesive 5 is small, it is not problematic.

3. Modifications

Although one embodiment of the present invention has been described above, the present invention is not limited to the above embodiment, and various changes can be made thereto without departing from the gist of the invention. Moreover, a plurality of modifications to be described below can be combined as appropriate.

3-1

Various antennas can be used as the antenna 3, and it is also possible to use a patch antenna instead of the above-described dipole antenna. That is, there is no particular limitation on the shape and the like of the antenna 3, and various modes are possible. Also, there is no particular limitation on the shape of the IC tag, that is, the shapes of the substrate 1 and the cover 4, and an outer shape that is not a rectangular shape is also possible as long as the outer shape extends in the lengthwise direction and the widthwise direction orthogonal to the lengthwise direction. Also, the substrate 1 and the cover 4 need not have the same shape.

3-2

Figure 9:
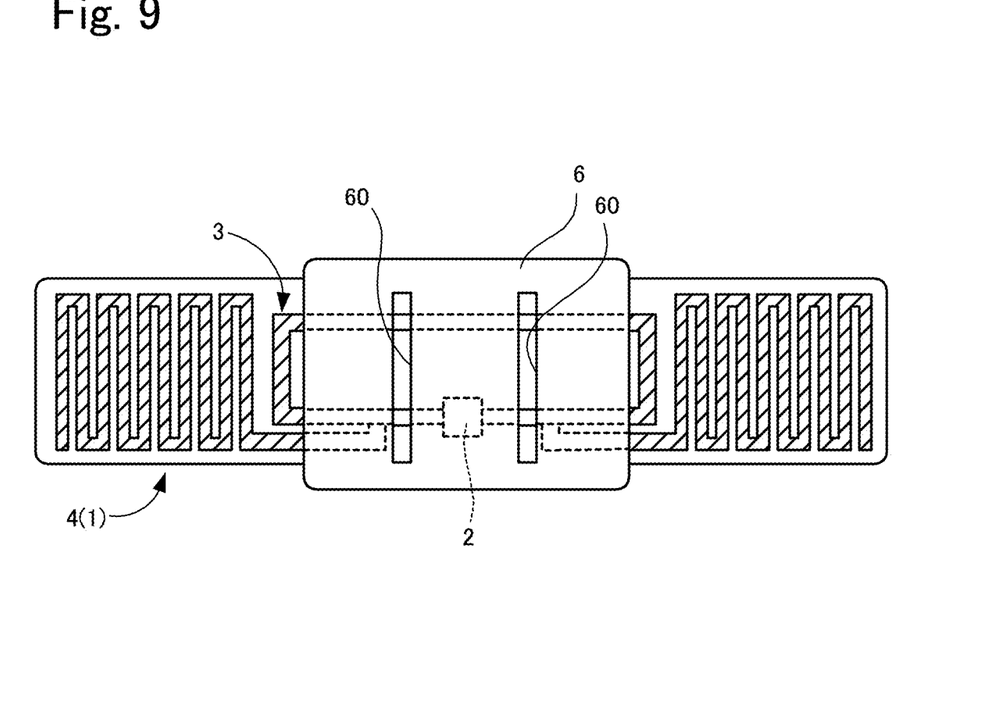
FIG. 9 is a plan view showing another example of the IC tag shown in FIG. 1.

There is no particular limitation on the configuration of the reinforcing member 6, and various modes are possible. For example, the shape in a plan view may also be, for example, a shape that is longer in the lengthwise direction and shorter in the widthwise direction, as shown in FIG. 9. Also, there is no limitation to this, and it is also possible to use a circular shape, an elliptical shape, a polygonal shape, or the like instead of the rectangular shape in a plan view.

3-3

There is no particular limitation on the number and positions of the slits, and two or more slits need only be provided with the IC chip 2 interposed therebetween. For example, the slits can also be provided in only the upper surface or only the lower surface of the inlet 10. Alternatively, for example, as shown in FIG. 9, if the reinforcing member 6 has a shape that is longer in the lengthwise direction, the pair of slits 60 are preferably arranged side by side in the lengthwise direction with the IC chip 2 interposed therebetween. That is, the slits are preferably arranged side by side in a direction in which bending is likely to occur.

Figure 10:
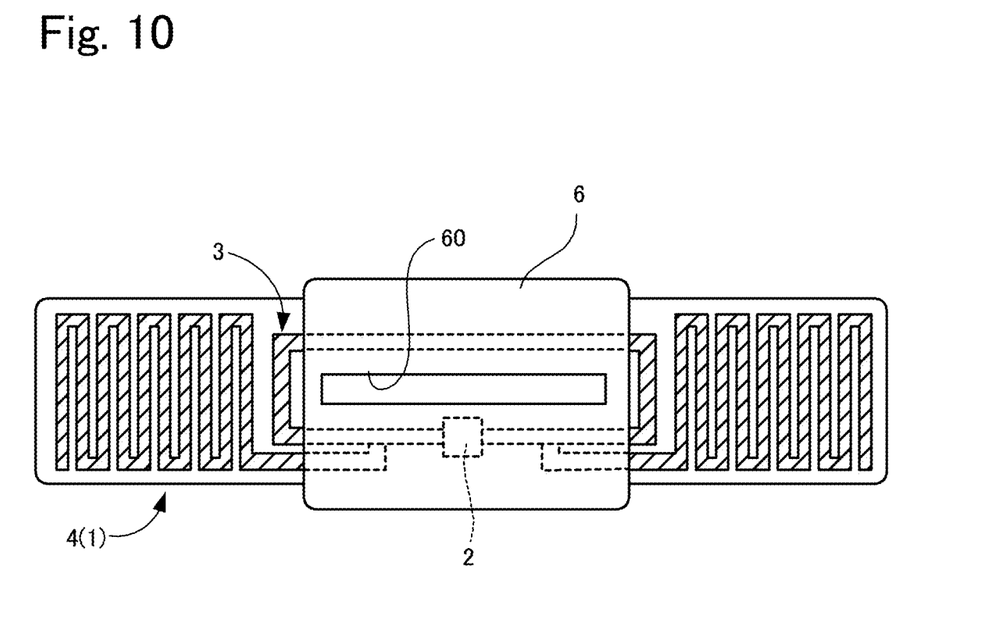
FIG. 10 is a plan view showing another example of the IC tag shown in FIG. 1.

Also, as shown in FIG. 10, one or more slits 60 can be formed so as to extend in a direction in which bending is likely to occur, and thus bending can be suppressed.

The slits may also penetrate through the reinforcing member 6 as slits, or may be grooves.

The slits or grooves are not essential and may also not be provided.

3-4

Figure 11:
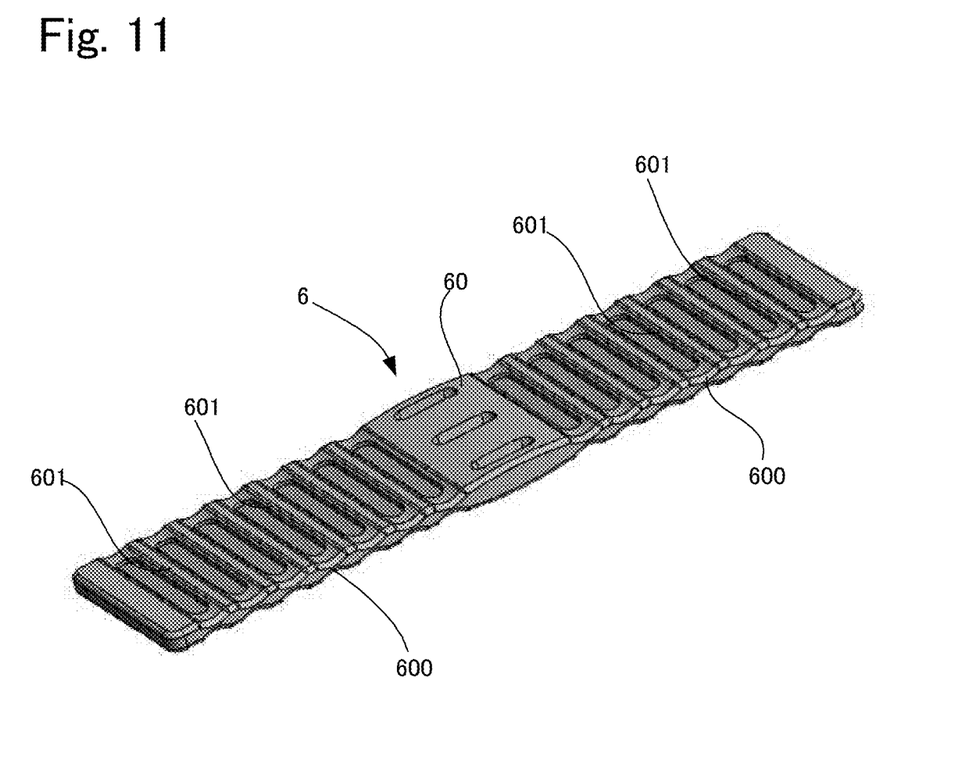
FIG. 11 is a perspective view showing another example of the IC tag shown in FIG. 1.

In the above-described embodiment, the reinforcing member 6 is arranged near the center in the lengthwise direction of the inlet 10 so as to mainly cover the IC chip 2, but the reinforcing member 6 may also be formed so as to cover a greater number of portions of the inlet 10 as well. For example, as shown in FIG. 11, the reinforcing member 6 can also be formed so as to cover the entirety of the inlet 10. In this example, the reinforcing member 6 is elongated in the lengthwise direction from the state shown in FIGS. 1 and 2 and covers the entirety of the inlet 10. That is, in this example, the reinforcing member 6 is constituted by a central portion 60 shown in FIGS. 1 and 2, and an elongated portion 600 elongated from the central portion 60 in the lengthwise direction. The elongated portion 600 of the reinforcing member 6 is arranged so as to cover a portion of the impedance matching portion 31 and the dipole portions 32. Also, a slit 601 that extends in the widthwise direction is formed at each predetermined interval in the lengthwise direction in the elongated portion 600. These slits 601 can be formed in both surfaces of the inlet 10. By forming the slits 601 that extend in the widthwise direction in this manner, it is possible to flexibly bend the inlet 10 while protecting the IC chip 2 and the antenna 3 with respect to the bending shown in FIG. 6, even if the entirety of the inlet 10 is covered by the reinforcing member 6. That is, the elongated portion 600 is more likely to bend at the locations at which the slits 601 are formed, and therefore, in particular, it is possible to suppress a case in which the force of bending reaches the central portion 60 at which the IC chip 2 is arranged. Accordingly, it is possible to prevent the IC chip 2 and the antenna 3 in the surrounding area of the IC chip 2 from breaking.

Note that this mode of the elongated portion 600 of the reinforcing member 6 is one example, and for example, the number and orientations of the slits 601 can be changed as appropriate. Alternatively, it is also possible to not include the slits 601. Also, the elongated portion 600 need not cover the entirety of the inlet 10, and the elongated portion 60 can also be arranged only on a portion in the lengthwise direction.

3-5

In the above-described embodiment, as the inlet 10, the pressure-sensitive adhesive 5 is applied over the entire surface between the substrate 1 and the cover 4, but the configuration of the inlet 10 is not limited thereto. For example, the pressure-sensitive adhesive can also be applied to only the peripheral edge of the substrate 1 and the cover 4, and the IC chip 2 and the antenna 3 can be surrounded by the pressure-sensitive adhesive 5. Also, it is possible to use various inlets, such as an inlet in which the cover is not provided, and the IC chip 2 and the antenna 3 on the substrate 1 are covered by the pressure-sensitive adhesive. That is, the inlet need only include at least the substrate, the IC ship, and the antenna.

LIST OF REFERENCE NUMERALS

1 Substrate
2 IC tag
3 Antenna
4 Cover
5 Pressure-sensitive adhesive
6 Reinforcing member
60 to 63 Slit
10 Inlet (tag main body)

The invention claimed is:
1. An IC tag comprising:
   a sheet-shaped tag main body having an outer shape that extends in a lengthwise direction and a widthwise direction orthogonal to the lengthwise direction; and
   a reinforcing member that is arranged along the widthwise direction so as to cover an upper surface, a lower surface and a side surface of the tag main body,
   wherein the tag main body includes:
   an IC chip;
   an antenna configured to electrically transmit and receive information stored in the IC chip; and
   a sheet-shaped substrate that supports the IC chip and the antenna,
   wherein the reinforcing member is made of a material having a Shore D hardness that is less than or equal to a Shore D hardness of the substrate, and is arranged so as to cover at least the IC chip.
2. The IC tag according to claim 1, wherein the length in the lengthwise direction of the reinforcing member is shorter than the length in the widthwise direction.
3. The IC tag according to claim 1, wherein at least one slit or groove that extends in the lengthwise direction is formed in the reinforcing member.
4. The IC tag according to claim 3, wherein
   at least a pair of the slits or the grooves are formed, and
   the pair of slits or grooves are arranged with the IC chip interposed therebetween in the widthwise direction.
5. The IC tag according to claim 1, wherein the tag main body further includes:
   a sheet-shaped cover that covers the IC chip and the antenna, the IC chip and the antenna being disposed between the cover and the substrate; and
   a pressure-sensitive adhesive or bonding agent that bonds the cover and the substrate.
6. The IC tag according to claim 1, wherein the reinforcing member is made of elastomer.
7. The IC tag according to claim 6, wherein the elastomer contains glass fibers.

* * * * *